US008963875B2

(12) United States Patent
Sugiura et al.

(10) Patent No.: US 8,963,875 B2
(45) Date of Patent: Feb. 24, 2015

(54) TOUCH SCREEN DEVICE WITH WET DETECTION AND CONTROL METHOD THEREOF

(75) Inventors: Chikashi Sugiura, Hamura (JP); Hiroshi Fujimura, Yokohama (JP); Akinori Kawamura, Kunitachi (JP); Takashi Sudo, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 286 days.

(21) Appl. No.: 13/330,595

(22) Filed: Dec. 19, 2011

(65) Prior Publication Data

US 2012/0249470 A1    Oct. 4, 2012

(30) Foreign Application Priority Data

Mar. 31, 2011    (JP) .................................. 2011-080616

(51) Int. Cl.
*G06F 3/045* (2006.01)
*G06F 1/16* (2006.01)
*G06F 3/041* (2006.01)
*G06F 3/044* (2006.01)

(52) U.S. Cl.
CPC ............ *G06F 1/1643* (2013.01); *G06F 3/0416* (2013.01); *G06F 1/1694* (2013.01); *G06F 3/044* (2013.01)
USPC ...... 345/174; 345/173; 178/18.05; 178/18.06; 178/18.07; 178/19.01

(58) Field of Classification Search
CPC ..... G06F 3/0418; G06F 3/0488; G06F 3/041; G06F 3/0416; B32B 17/10
USPC ......... 345/174, 173; 178/18.05, 18.06, 18.07, 178/19.01
See application file for complete search history.

(56) References Cited

U.S. PATENT DOCUMENTS

| | | | | |
|---|---|---|---|---|
| 4,992,779 A | * | 2/1991 | Sugino et al. .................. | 345/173 |
| 5,526,422 A | * | 6/1996 | Keen .............................. | 379/396 |
| 6,208,331 B1 | * | 3/2001 | Singh et al. .................... | 345/173 |
| 6,993,607 B2 | * | 1/2006 | Philipp ........................... | 710/67 |
| 7,053,887 B2 | * | 5/2006 | Kraus et al. .................... | 345/173 |
| 7,256,714 B2 | * | 8/2007 | Philipp ............................ | 341/33 |
| 7,716,981 B2 | * | 5/2010 | Schmitt et al. ............. | 73/170.17 |

(Continued)

FOREIGN PATENT DOCUMENTS

| | | |
|---|---|---|
| JP | H09-127260 | 5/1997 |
| JP | 2010-157189 | 7/2000 |

(Continued)

OTHER PUBLICATIONS

Machine translation of JP 2012-123740 A, Inoue, Jun. 28, 2012.*

(Continued)

*Primary Examiner* — Lun-Yi Lao
*Assistant Examiner* — Peter D McLoone
(74) *Attorney, Agent, or Firm* — Knobbe, Martens, Olson & Bear LLP (57) ABSTRACT

According to one embodiment, an electronic device includes a touch panel, an operation module, a detector, and a switch module. The touch panel and the operation module are configured to receive an operation command. The detector detects whether the touch panel is wet based on a touch position detected by the touch panel. The switch module switches, if the touch panel is wet, the receiver of the operation command from the touch panel to the operation module.

15 Claims, 7 Drawing Sheets

(56) References Cited

U.S. PATENT DOCUMENTS

| | | | |
|---|---|---|---|
| 7,791,505 B2* | 9/2010 | Satake | 341/22 |
| 8,018,440 B2* | 9/2011 | Townsend et al. | 345/173 |
| 8,514,195 B2* | 8/2013 | Arnold et al. | 345/173 |
| 8,525,796 B2* | 9/2013 | Arnold et al. | 345/173 |
| 2004/0008129 A1* | 1/2004 | Philipp | 341/22 |
| 2005/0052432 A1* | 3/2005 | Kraus et al. | 345/173 |
| 2005/0246459 A1* | 11/2005 | Philipp | 710/67 |
| 2007/0152976 A1* | 7/2007 | Townsend et al. | 345/173 |
| 2008/0136792 A1* | 6/2008 | Peng et al. | 345/174 |
| 2008/0223127 A1* | 9/2008 | Schmitt et al. | 73/170.17 |
| 2009/0039901 A1 | 2/2009 | Delatte et al. | |
| 2009/0160780 A1* | 6/2009 | Arnold et al. | 345/173 |
| 2010/0138680 A1* | 6/2010 | Brisebois et al. | 713/324 |
| 2010/0171716 A1 | 7/2010 | Ikeda et al. | |
| 2012/0146924 A1 | 6/2012 | Inoue | |
| 2012/0223904 A1* | 9/2012 | Arnold et al. | 345/173 |
| 2013/0207935 A1* | 8/2013 | Toda et al. | 345/174 |

FOREIGN PATENT DOCUMENTS

| | | |
|---|---|---|
| JP | 2005-339342 | 12/2005 |
| JP | 2008-030646 | 2/2008 |
| JP | 2009-505038 | 2/2009 |
| JP | 2012-123740 | 6/2012 |
| WO | WO 2007/006781 | 1/2007 |

OTHER PUBLICATIONS

Japanese Office Action dated Jul. 3, 2012 for Japanese Application No. 2011-080616 filed on Mar. 31, 2011.

* cited by examiner

TOUCH SCREEN DEVICE WITH WET DETECTION AND CONTROL METHOD THEREOF

CROSS-REFERENCE TO RELATED APPLICATIONS

This application is based upon and claims the benefit of priority from Japanese Patent Application No. 2011-080616, filed on Mar. 31, 2011, the entire contents of which are incorporated herein by reference.

FIELD

Embodiments described herein relate generally to an electronic device and a control method.

BACKGROUND

Some electronic devices such as mobile telephones and personal digital assistants (PDAs) are provided with a touch panel that receives user input by touch. Such an electronic device allows the user to operate it by directly touching the display screen, thereby providing improved operability.

If, for example, a capacitive touch panel is touched when it is wet with water, points where the user does not touch may be regarded as touched. As a result, user's intended operation may not be performed, which decreases the operability.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic device comprises a touch panel, an operation module, a detector, and a switch module. The touch panel and the operation module are configured to receive an operation command. The detector is configured to detect whether the touch panel is wet based on a touch position detected by the touch panel. The switch module is configured to switch, if the touch panel is wet, the receiver of the operation command from the touch panel to the operation module.

Exemplary embodiments will be described in detail below with reference to the accompanying drawings. The electronic device of the embodiments may be, for example, a personal digital assistant (PDA), a mobile telephone, or the like.

Figure 1:
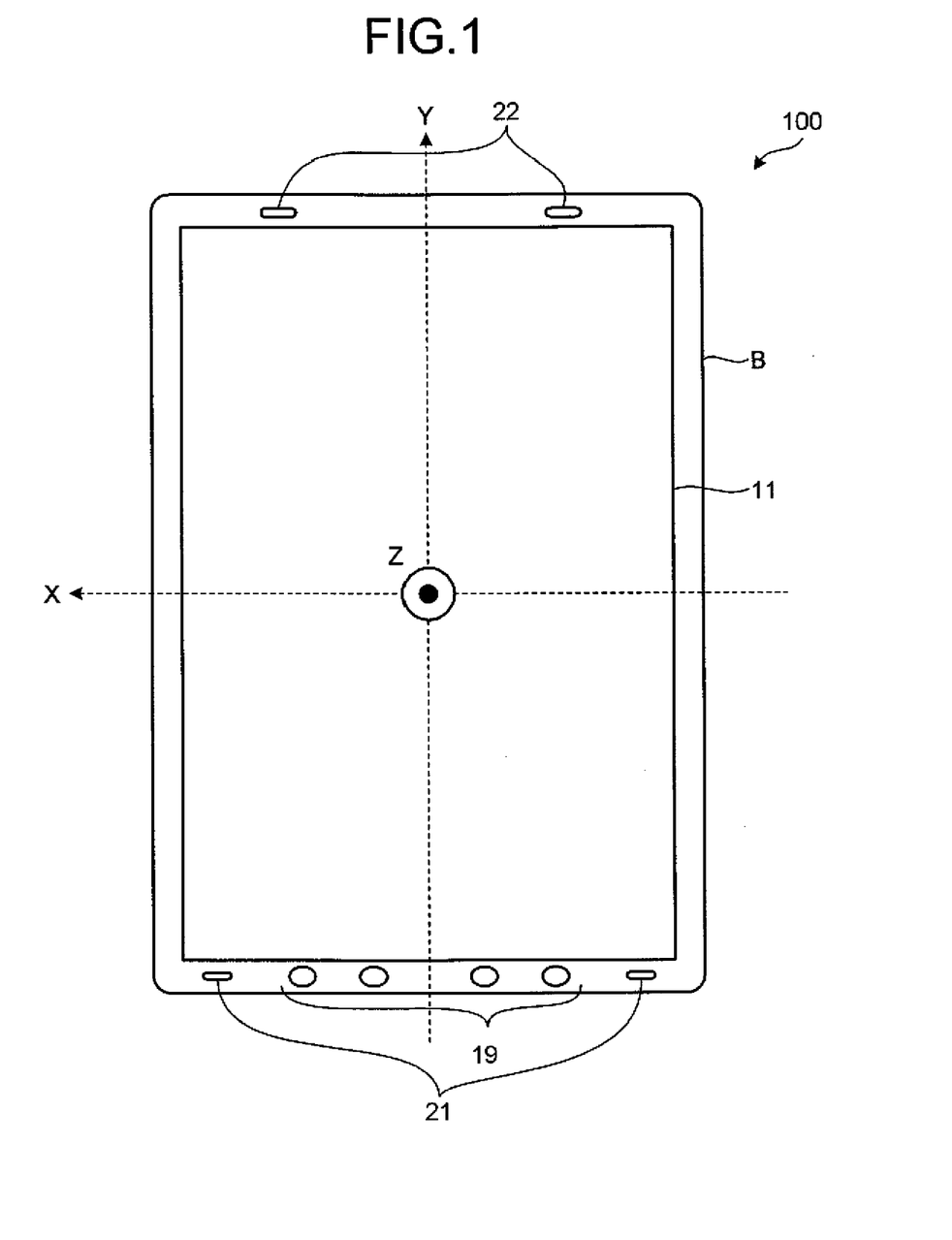
FIG. 1 is an exemplary schematic external view of an electronic device according to an embodiment.

FIG. 1 is a schematic external view of an electronic device 100 according to an embodiment. The electronic device 100 is an information processor provided with a display screen and is implemented as a slate terminal (a tablet terminal), an electronic book reader, a digital photo frame, or the like. Arrow directions of X, Y, and Z axis (regarding Z axis, the front direction of FIG. 1) are defined herein as forward directions.

The electronic device 100 comprises a flat box-like housing B, on which is arranged a display module 11. The display module 11 comprises a touch panel (see FIG. 2, a touch panel 111) that detects a position where the user touches on the display screen. Arranged on the lower side of the front surface of the housing B are operation switches 19 that are operation modules to allow the user to input operation commands and microphones 21 that picks up user's voice. Arranged on the upper side of the front surface of the housing B are speakers 22 for audio output.

Figure 2:
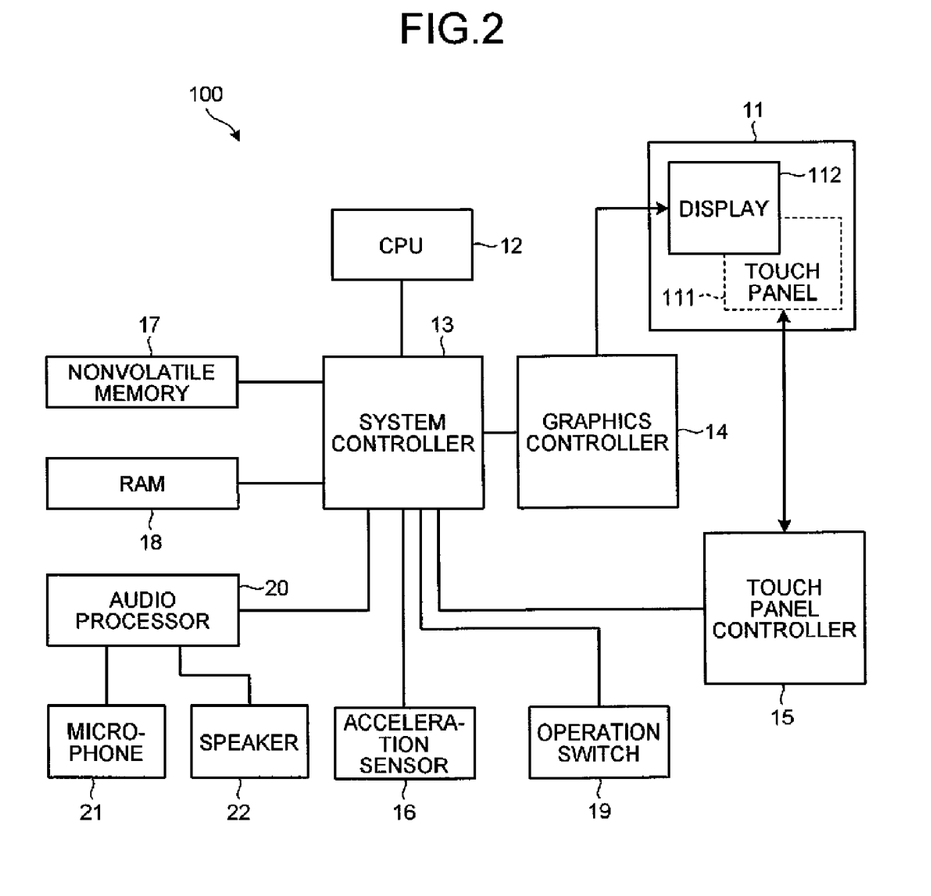
FIG. 2 is an exemplary block diagram of a hardware configuration of the electronic device in the embodiment.

FIG. 2 illustrates an example of a hardware configuration of the electronic device 100 of the embodiment. As illustrated in FIG. 2, the electronic device 100 further comprises a central processing unit (CPU) 12, a system controller 13, a graphics controller 14, a touch panel controller 15, an acceleration sensor 16, a nonvolatile memory 17, a random access memory (RAM) 18, and an audio processor 20.

The display module 11 comprises the touch panel 111 and a display 112 such as a liquid crystal display (LCD) and an electroluminescent (EL) display. The touch panel 111 comprises, for example, a coordinate detector on the display screen of the display 112. The touch panel 111 is capable of detecting a position (touch position) on the display screen where the user touches with his/her finger while holding the housing B. With the operation of the touch panel 111, the display screen of the display 112 functions as a touch screen.

More specifically, the touch panel 111 may be a resistive touch panel, a capacitive touch panel, an electromagnetic induction touch panel, or the like, and detects a touch position on the display screen. For example, the touch panel 111 may be a projected capacitive touch panel that sequentially scans a matrix in the X- and Y-axis directions to detect a capacitance change and converts it into a position in the X- and Y-axis directions. Such a projected capacitive touch panel can easily detects a plurality of touch positions by sequentially scanning a matrix in the X- and Y-axis directions. Although the touch panel 111 of the embodiment will be described as a projected capacitive touch panel capable of detecting a plurality of touch positions, the touch panel 111 may be a resistive touch panel or the like as long as it can detect a plurality of touch positions.

The CPU 12 is a processor that controls the overall operation of the electronic device 100 and controls each module through the system controller 13. The CPU 12 executes an operating system (OS) and various application programs loaded from the nonvolatile memory 17 into the RAM 18, thereby implementing functional modules (see FIG. 3), which will be described later. The RAM 18 provides a work area for the CPU 12 to execute the programs as the main memory of the electronic device 100.

The system controller 13 comprises a built-in memory controller that controls access to the nonvolatile memory 17 and the RAM 18. The system controller 13 has the function of communicating with the graphics controller 14.

The graphics controller 14 is a display controller that controls the display 112 used as a display monitor of the electronic device 100. The touch panel controller 15 controls the touch panel 111 and obtains from the touch panel 111 coordinate data indicating a touch position on the display screen of the display 112 where the user touches.

The acceleration sensor 16 is a 6-axis acceleration sensor for detection in six axis directions including three axis directions illustrated in FIG. 1 (the X-, Y-, and Z-axis directions) and rotation directions about the respective axes. The acceleration sensor 16 detects the direction and magnitude of acceleration from the outside with respect to the electronic device 100, and outputs the detection result to the CPU 12. More specifically, the acceleration sensor 16 outputs to the CPU 12 an acceleration detection signal (tilt information) indicating an axis on which acceleration is detected, the direction or orientation of the acceleration (in the case of rotation, the angle of the rotation), and the magnitude of the acceleration. The acceleration sensor 16 may be integrated with a gyrosensor to detect angular velocity (the angle of rotation). The acceleration sensor 16 is one of operation modules to allow the user to input operation commands by tilting the electronic device 100.

The audio processor 20 performs audio processing on an audio signal received through the microphones 21 and outputs it to the CPU 12. Examples of the audio processing include digital conversion, noise removal, echo cancellation, and the like. The CPU 12 performs voice recognition based on the audio signal output from the audio processor 20 and receives an operation command corresponding to recognized voice. That is, the microphones 21 are each one of the operation modules to allow the user to input operation commands by voice. Under the control of the CPU 12, the audio processor 20 performs audio processing such as voice synthesis to generate an audio signal and outputs it to the speakers 22 for voice notification over the speakers 22.

Figure 3:
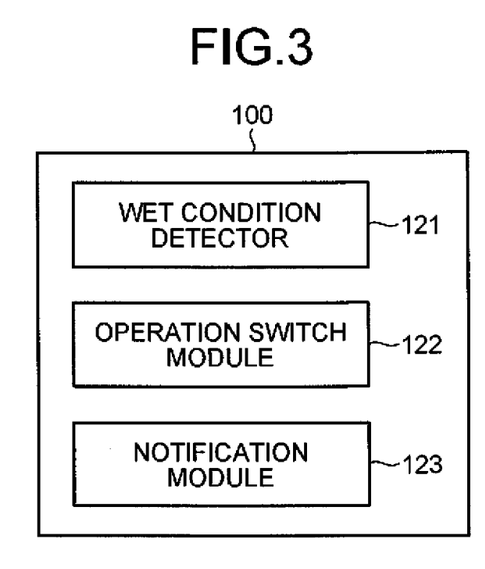
FIG. 3 is an exemplary functional block diagram of the electronic device in the embodiment.

FIG. 3 is a functional block diagram of the electronic device 100. As illustrated in FIG. 3, the electronic device 100 comprises, through the cooperation between the CPU 12 and software (the OS and the application programs), functional modules such as a wet condition detector 121, an operation switch module 122, and a notification module 123.

The wet condition detector 121 detects whether the touch panel 111 is wet with water or the like based on a touch position detected by the touch panel 111. More specifically, the wet condition detector 121 determines that the touch panel 111 is wet if a plurality of touch positions exceeding a predetermined value is detected by the touch panel 111, if an area corresponding to touch positions detected by the touch panel 111 is larger than a predetermined size, if each of touch positions detected by the touch panel 111 or an area corresponding to the touch positions moves, or if the number of touch positions detected by the touch panel 111 changes. When at least one of the above conditions is satisfied, the wet condition detector 121 may determine that the touch panel 111 is wet.

Figure 4:
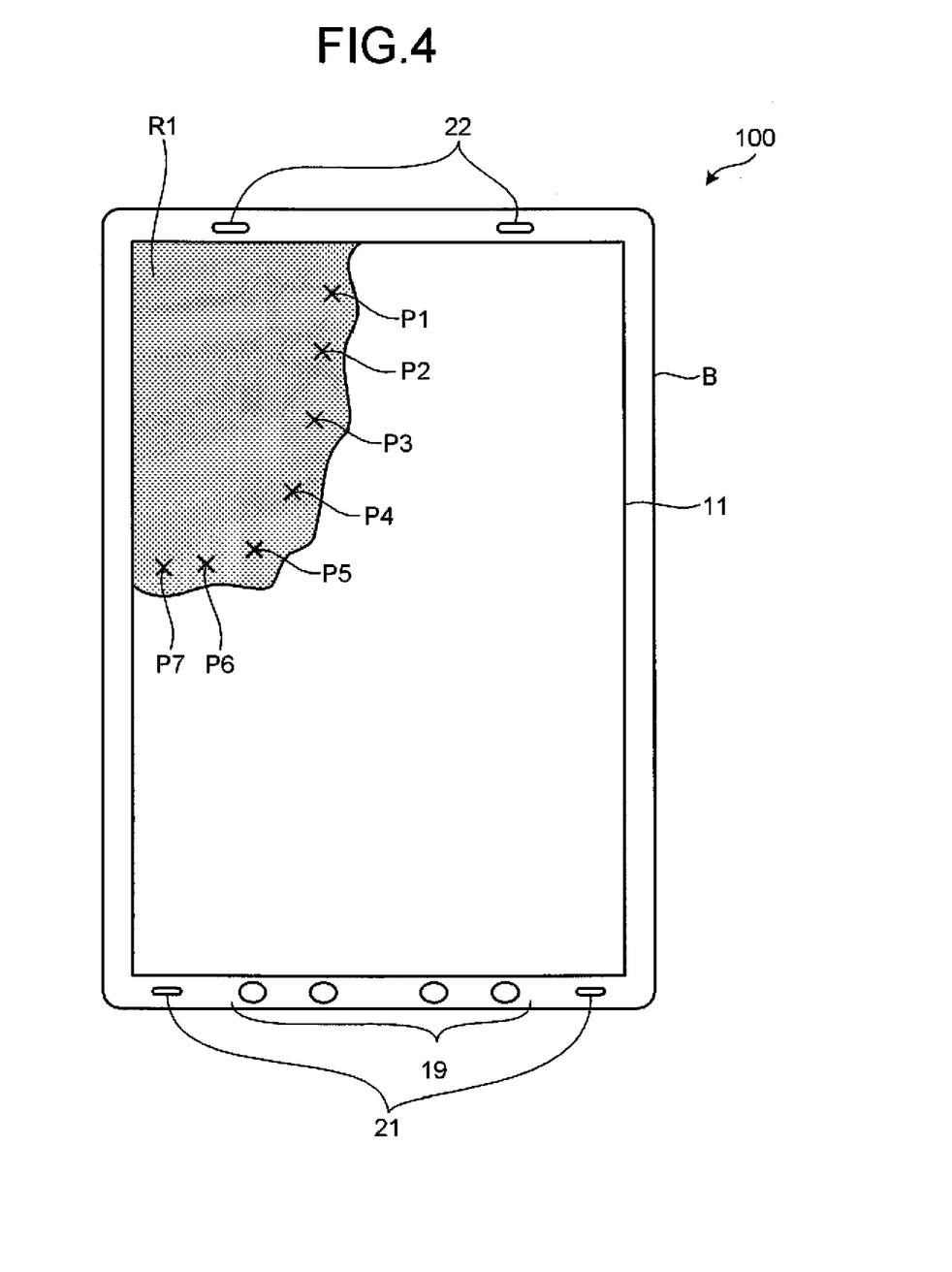
FIGS. 4 and 5 are exemplary conceptual diagrams of a wet touch panel in the embodiment.

FIG. 4 illustrates an example of the wet touch panel 111. In FIG. 4, an area R1 is part of the touch panel 111 of the display module 11 where water or the like adheres (wet range). On the touch panel 111 that is wet with water or the like as illustrated in FIG. 4, the capacitance changes in the area R1 corresponding to the wet range. As a result, touch positions P1 to P7 are detected in the area R1. Accordingly, by detecting whether the number of touch positions exceeds a predetermined value, it can be detected whether the touch panel 111 is wet. Besides, water moves on the surface of the touch panel 111, which extends the wet area R1. Accordingly, by detecting whether an area corresponding to the plurality of touch positions P1 to P7 (for example, an area including the touch positions P1 to P7 and surrounded by touch positions on the most outer circumference) is larger than a predetermined size, it can be detected whether the touch panel 111 is wet. The touch positions P1 to P7 detected in the area R1 corresponding to the wet range move like a Brownian motion. For example, if the position P1 at time t is defined as (xt, yt), then (Δxt, Δyt)=(xt, yt)−(xt−1, yt−1), and Δxt and Δyt each behave as a random number. Accordingly, for example, by detecting whether each of the touch positions P1 to P7 moves like a random number, it can be detected whether the touch panel 111 is wet. Incidentally, the movement of the touch positions may not be continuous, and the start/end of the touch positions may be generated as a random number. Further, in the area R1 corresponding to the wet range, the wet condition changes at several points as water moves. As a result, the number of the detected touch positions P1 to P7 changes. For example, if the number of touch positions detected at time t is N, Nt changes in a short period such as 0.1 second. Accordingly, for example, by detecting whether the number of the touch positions P1 to P7 changes like a random number, it can be detected whether the touch panel 111 is wet.

Figure 5:
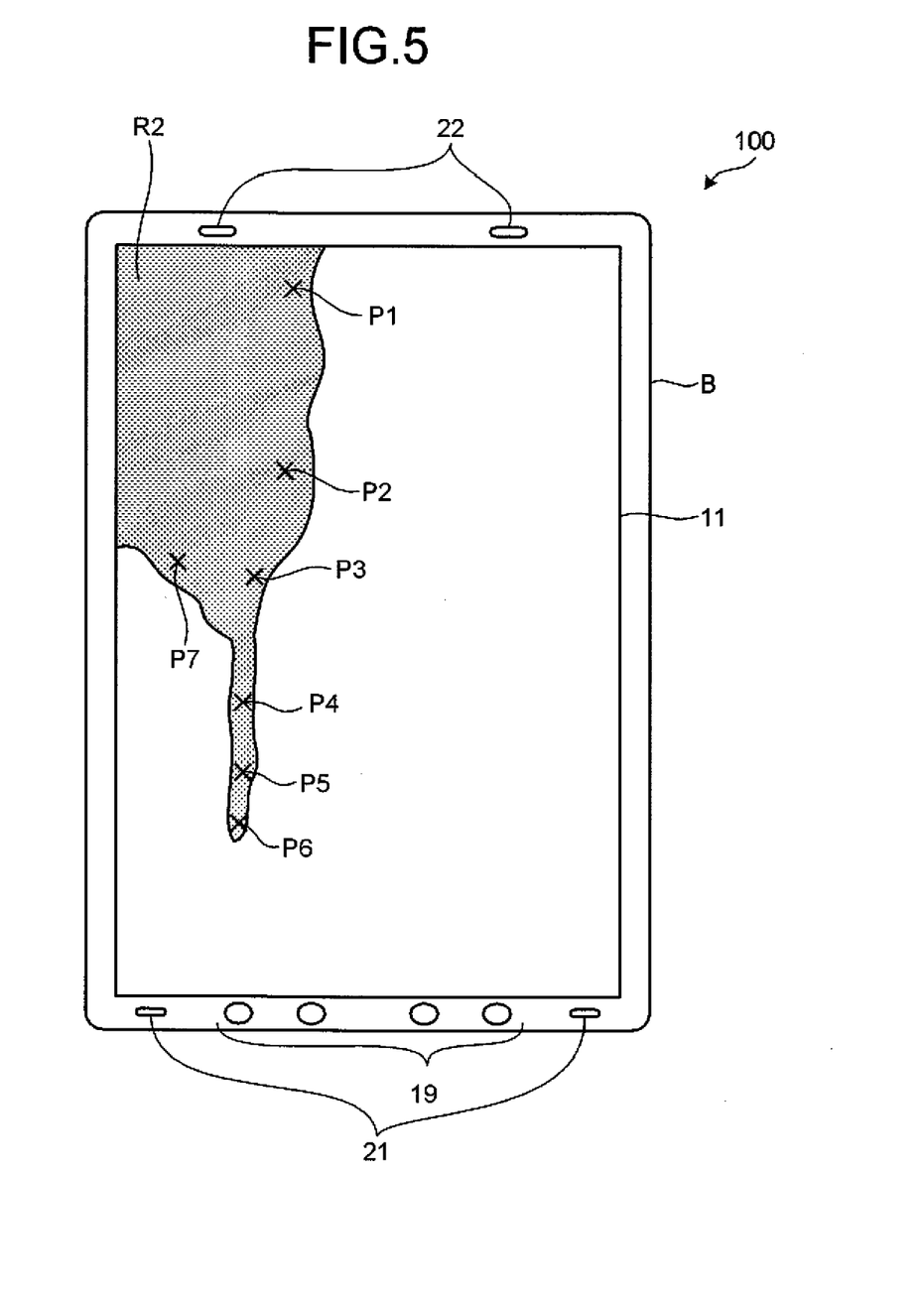

FIG. 5 illustrates another example of the wet touch panel 111. More specifically, FIG. 5 illustrates an area R2 that has changed from the area R1 illustrated in FIG. 4. The area R2 in FIG. 5 indicates that the wet range represented by the area R1 in FIG. 4 moves or extends downward while, for example, the user holds the electronic device 100 with the Y-axis direction pointing vertically upward. Thus, by detecting whether an area corresponding to the touch positions P1 to P7 moves, it can be detected whether the touch panel 111 is wet.

Referring back to FIG. 3, if the touch panel 111 is wet, the operation switch module 122 switches the receiver of operation commands from the touch panel 111 to an operation module except the touch panel 111. More specifically, if the touch panel 111 is determined as wet based on the detection result of the wet condition detector 121, the operation switch module 122 stops receipt of operation commands from the touch panel 111 and starts receiving the operation commands having been received by the touch panel 111 through operation on the operation switches 19, audio input to the microphones 21, a tile of the electronic device 100 detected by the acceleration sensor 16, or the like. Accordingly, in the electronic device 100, even if the touch panel 111 is wet with water or the like, it is prevented that a point where the user does not touch is regarded as touched and user's intended operation is not performed. Thus, operation desired by the user can be received. The operation switch module 122 may start receiving operation commands through operation on the operation switches 19, audio input to the microphones 21, a tile of the electronic device 100 detected by the acceleration sensor 16, or the like set in advance on the setting screen or the like.

If the touch panel 111 is wet, the notification module 123 notifies the user of the wet condition by audio output from the speakers 22, display of the display 112, or the like. More specifically, if the touch panel 111 is determined as wet based on the detection result of the wet condition detector 121, the notification module 123 outputs a control signal to the audio processor 20 to output an alarm from the speakers 22, or outputs a control signal to the graphics controller 14 to display an image notifying the user of the wet condition on the display screen of the display 112.

Figure 6:
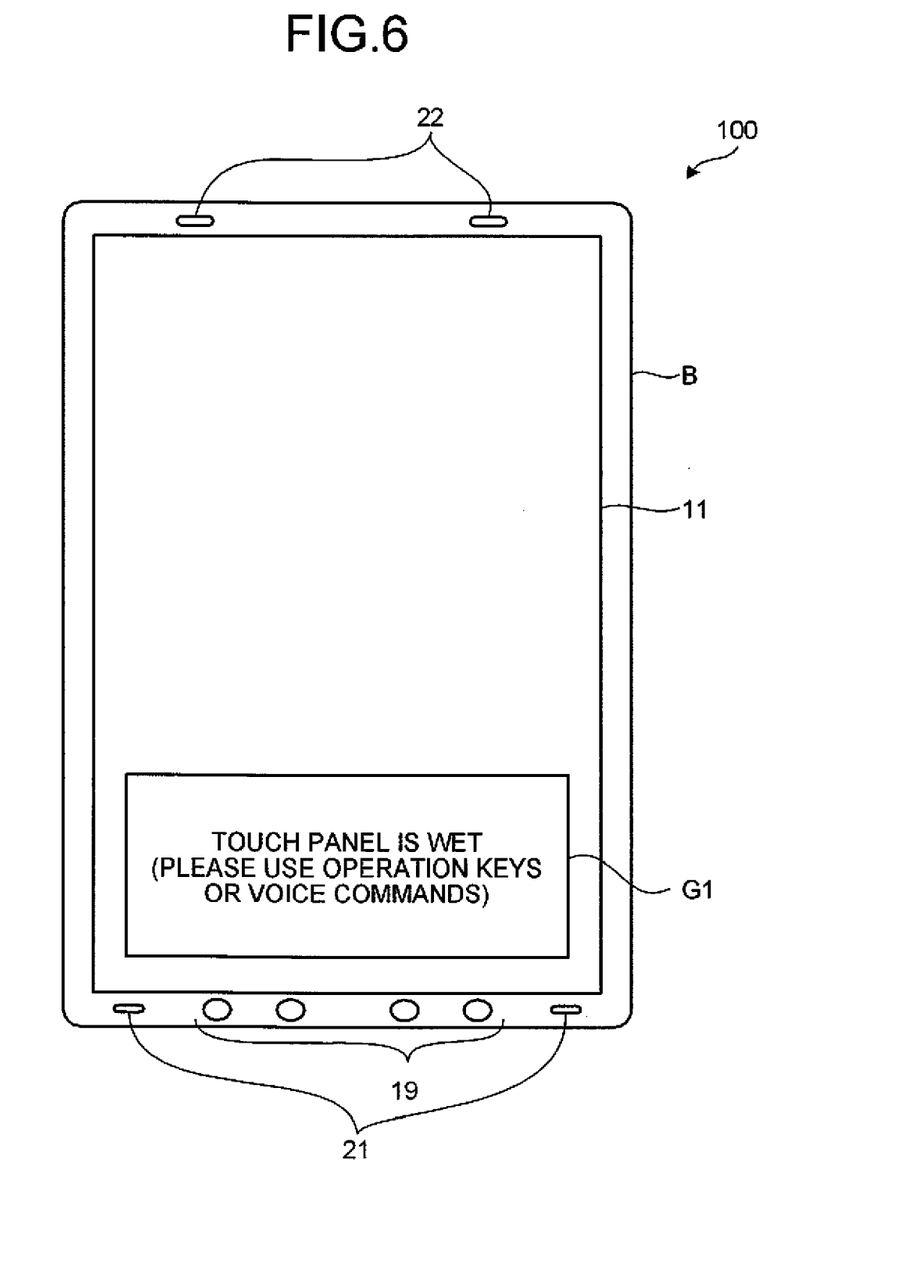
FIG. 6 is an exemplary conceptual diagram of the touch panel notifying the wet condition thereof in the embodiment.

FIG. 6 illustrates an example of the touch panel 111 notifying the user of the wet condition. As illustrated in FIG. 6, when the touch panel 111 is wet, the display module 11 displays a notification image G1 notifying the user that the operation input has been switched because the touch panel 111 is wet. Thus, by checking the notification image G1 displayed on the display module 11, the user is notified of that the operation input has been switched because the touch panel 111 is wet.

Figure 7:
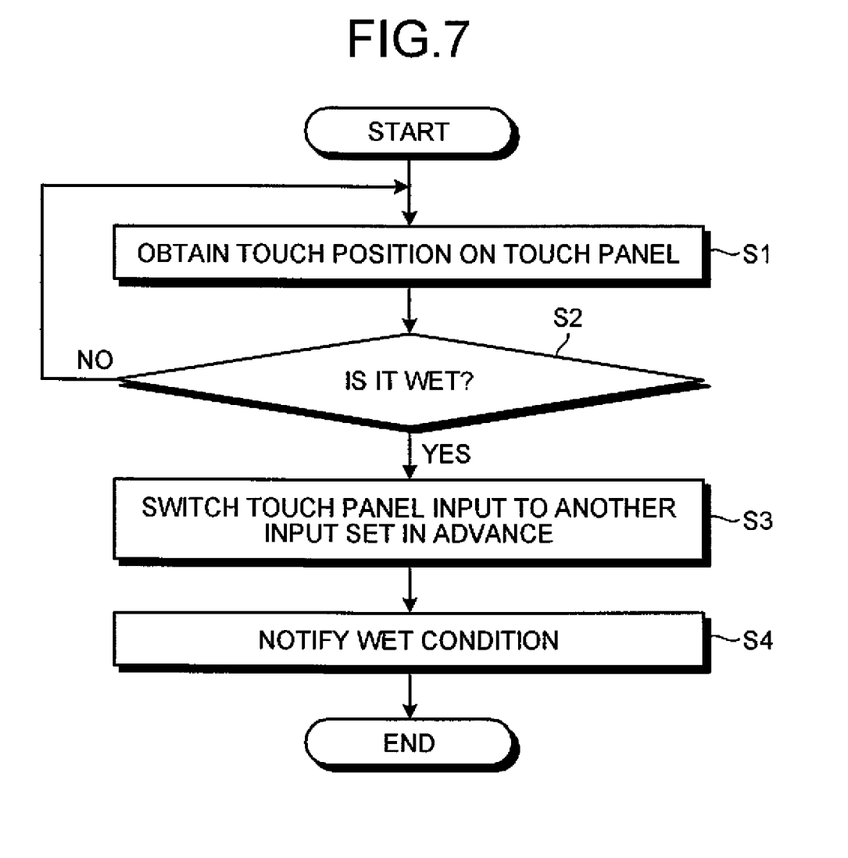
FIG. 7 is an exemplary flowchart of the operation of the electronic device in the embodiment.

FIG. 7 is a flowchart of an example of the operation of the electronic device 100. As illustrated in FIG. 7, first, the wet condition detector 121 obtains a touch position on the touch panel 111 (S1). The wet condition detector 121 then detects whether the touch panel 111 is wet with water or the like based on the touch position (S2). If the touch panel 111 is not wet (No at S2), the process returns to S1.

On the other hand, if the touch panel 111 is wet (Yes at S2), the operation switch module 122 switches the operation input from the touch panel 111 to another operation module set in advance to receive input through operation on the operation switches 19, audio input to the microphones 21, a tile of the electronic device 100 detected by the acceleration sensor 16, or the like (S3). After that, the notification module 123 notifies the user that the touch panel 111 is wet by audio output from the speakers 22, display of the display 112, or the like. Then, the process ends.

A computer program may be executed on a computer to realize the same function as the electronic device 100. The computer program may be provided as being stored in advance in ROM or the like. The computer program may also be provided as being stored in a computer-readable storage medium, such as a compact disc-read only memory (CD-ROM), a flexible disk (FD), a compact disc recordable (CD-R), and a digital versatile disc (DVD), as a file in an installable or executable format.

The computer program may also be stored in a computer connected via a network such as the Internet so that it can be downloaded therefrom via the network. Further, the computer program may be provided or distributed via a network such as the Internet.

The computer program comprises modules that implement the elements described above. As real hardware, the CPU (processor) loads the computer program from the ROM into the main memory and executes it. With this, the above elements are implemented on the main memory.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a touch panel configured to receive an operation command for performing a first process;
    an operation interface configured to receive an operation command for performing the first process;
    a detector configured to detect whether the touch panel is wet based on a touch position detected by the touch panel;
    a processor configured to switch, if the touch panel is wet, a receiver of an operation command from the touch panel to the operation interface so that the operation interface can receive an operation command instead of the touch panel, and configured to notify, if the receiver of the operation command is switched from the touch panel to the operation interface, a user that the touch panel is unusable to input an operation command and the receiver of the operation command is switched from the touch panel to the operation interface,
    wherein the operation interface is configured to receive the operation command by a switch button disposed on a surface of a housing of the electronic device, and the notifying the user comprises displaying on the touch panel that the receiver is switched to the switch button because the touch panel is wet.

2. The electronic device of claim 1, wherein the operation interface is configured to further receive the operation command by at least one of key operation, audio input, and a tilt of the electronic device.

3. The electronic device of claim 1, wherein
    the touch panel is configured to detect a plurality of touch positions, and
    the detector is configured to determine that the touch panel is wet if a number of the touch positions detected by the touch panel exceeds a first value.

4. The electronic device of claim 1, wherein
    the touch panel is configured to detect a plurality of touch positions, and
    the detector is configured to determine that the touch panel is wet if an area corresponding to the touch positions detected by the touch panel is larger than a first size.

5. The electronic device of claim 1, wherein
    the touch panel is configured to detect a plurality of touch positions, and
    the detector is configured to determine that the touch panel is wet if an area corresponding to the touch positions detected by the touch panel moves.

6. The electronic device of claim 1, wherein
    the touch panel is configured to detect a plurality of touch positions, and
    the detector is configured to determine that the touch panel is wet if each of the touch positions detected by the touch panel moves.

7. The electronic device of claim 1, wherein
    the touch panel is configured to detect a plurality of touch positions, and
    the detector is configured to determine that the touch panel is wet if a number of the touch positions detected by the touch panel changes.

8. The electronic device of claim 1, wherein the operation interface is configured to receive the operation command by a tilt of the electronic device detected by an acceleration sensor.

9. A control method applied to an electronic device comprising a touch panel and an operation interface configured to receive an operation command for performing a first process, the control method comprising:
    detecting whether the touch panel is wet based on a touch position detected by the touch panel;
    switching, by a processor, if the touch panel is wet, a receiver of an operation command from the touch panel to the operation interface so that the operation interface can receive an operation command instead of the touch panel, and notifying, if the receiver of the operation command is switched form the touch panel to the operation interface, a user that the touch panel is unusable to input an operation command and the receiver of the operation command is switched from the touch panel to the operation interface, wherein the operation interface is configured to receive the operation command by a switch button disposed on a surface of a housing of the electronic device, and the notifying in the user comprises displaying on the touch panel that the receiver is switched to the switch button because the touch panel is wet.

10. The control method of claim 9, wherein the operation interface is configured to further receive the operation command by at least one of key operation, audio input, and a tilt of the electronic device.

11. The control method of claim 9, further comprising detecting, by the touch panel, a plurality of touch positions, wherein the detecting comprises determining that the touch panel is wet if a number of the touch positions detected by the touch panel exceeds a predetermined value.

12. The control method of claim 9, further comprising detecting, by the touch panel, a plurality of touch positions, wherein the detecting comprises determining that the touch panel is wet if an area corresponding to the touch positions detected by the touch panel is larger than a predetermined size.

13. The control method of claim 9, further comprising detecting, by the touch panel, a plurality of touch positions, wherein the detecting comprises determining that the touch panel is wet if an area corresponding to the touch positions detected by the touch panel moves.

14. The control method of claim 9, further comprising detecting, by the touch panel, a plurality of touch positions, wherein the detecting comprises determining that the touch panel is wet if each of the touch positions detected by the touch panel moves.

15. The control method of claim 9, further comprising detecting, by the touch panel, a plurality of touch positions, wherein the detecting comprises determining that the touch panel is wet if a number of the touch positions detected by the touch panel changes.

* * * * *